Feb. 7, 1967   P. C. DIMITRACOPOULOS ET AL   3,302,520
PHOTOGRAPHIC SLIDES WITH SOUND TRACK
Original Filed May 5, 1959   3 Sheets-Sheet 1
FIG. 1.
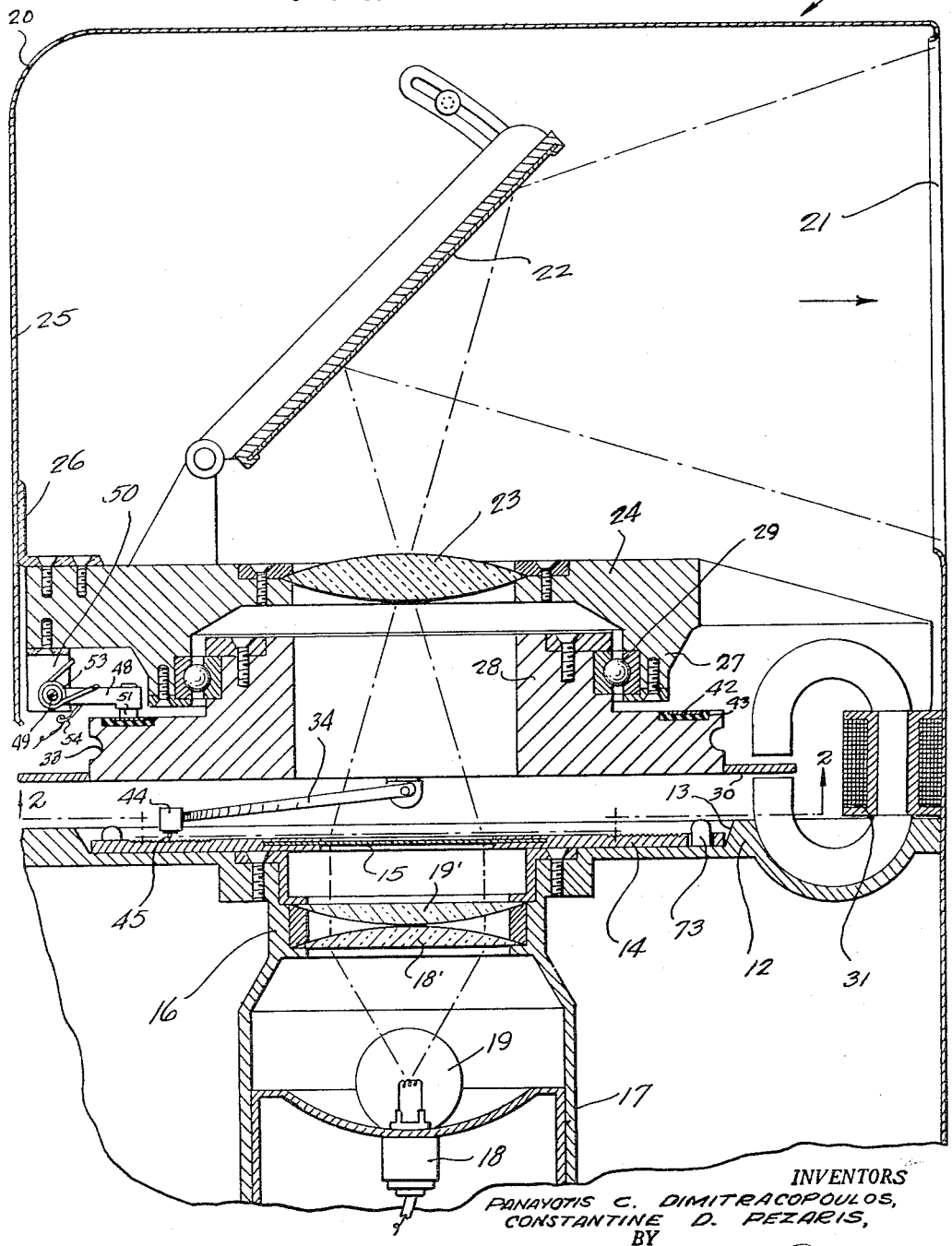
INVENTORS
PANAYOTIS C. DIMITRACOPOULOS,
CONSTANTINE D. PEZARIS,
BY
ATTORNEY.

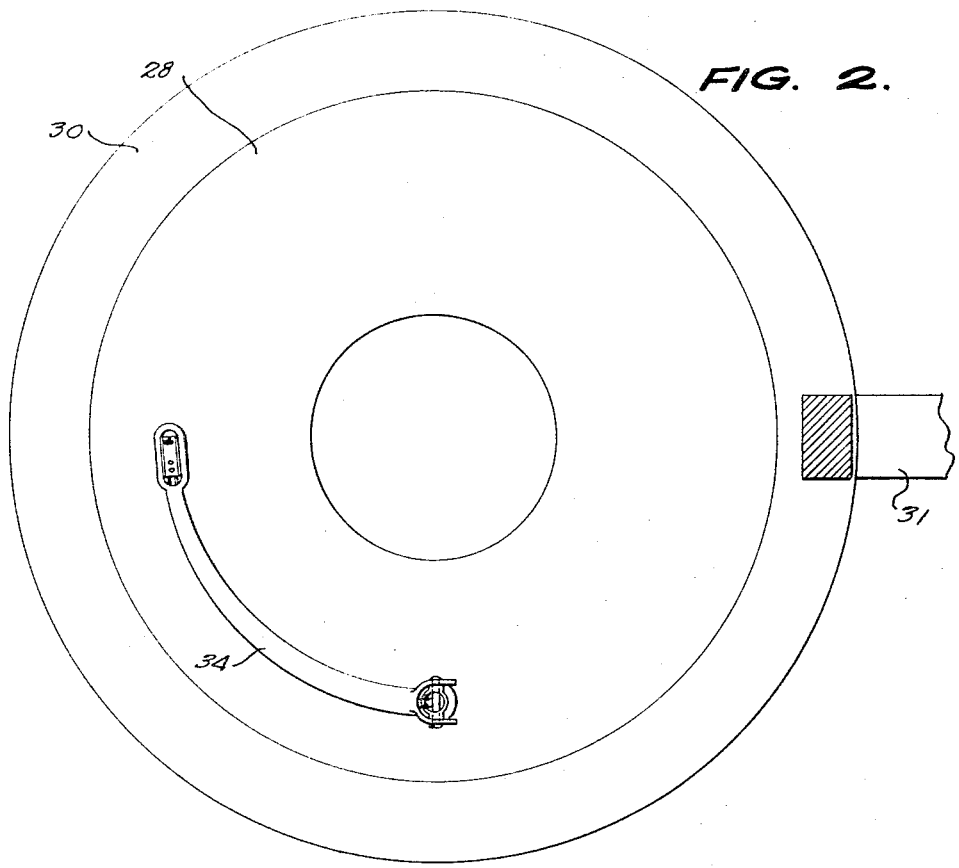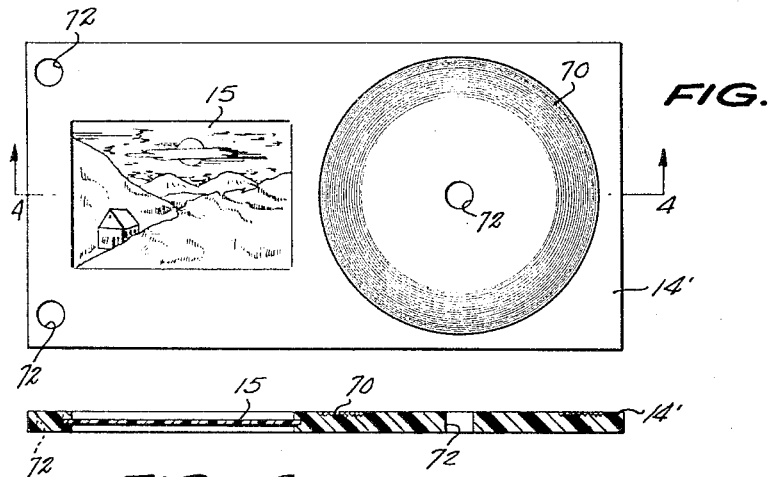

INVENTORS
PANAYOTIS C. DIMITRACOPOULOS,
CONSTANTINE D. PEZARIS,
BY
ATTORNEY.

United States Patent Office 3,302,520
Patented Feb. 7, 1967

3,302,520
PHOTOGRAPHIC SLIDES WITH SOUND TRACK
Panayotis C. Dimitracopoulos and Constantine D. Pezaris, Montreal, Quebec, Canada, assignors to The A. V. Corporation N.V., Curacao, Netherland Antilles, a corporation of the Netherlands
Original application May 5, 1959, Ser. No. 811,083, now Patent No. 3,122,053, dated Feb. 25, 1964. Divided and this application Nov. 27, 1963, Ser. No. 334,072
4 Claims. (Cl. 88—28)

This invention relates to means to simultaneously reproduce and project audio-visual information, and more particularly to means for projecting the visual information carried on photographic slides or transparencies, and simultaneously reproducing audio information provided in the form of a sound track carried by the slides or transparencies. This application is a division of Serial No. 811,083 filed May 5, 1959, now U.S. Patent No. 3,122,053.

A main object of the invention is to provide a novel means for associating a sound track with photographic slides or transparencies of otherwise standard types.

A still further object of the invention is to provide an improved device for carrying audio-visual information in the form of material inscribed on a transparency and information placed in the form of a spiral sound track adapted to be reproduced by use of a phonograph pick-up, whereby the visual and audio information may be embodied in a single, relatively small carrier which is easy to handle, which is convenient to store or transport, and which is of a durable nature.

Further objects and advantages of the invention will become apparent from the following description and claims, and from the accompanying drawings, wherein:

FIGURE 1 is a vertical cross sectional view taken through the patented apparatus for simultaneously reproducing and projecting audio-visual information from slides or tablets in accordance with the present invention, the apparatus being shown with an audio-visual information-carrying tablet member disposed therein.

FIGURE 2 is a horizontal cross sectional view taken on the line 2—2 of FIGURE 1.

FIGURE 3 is a top view of an audio-visual tablet, the spiral sound track being laterally adjacent to the visual information.

FIGURE 4 is a vertical, cross sectional view taken on the line 4—4 of FIGURE 3.

Figure 5:
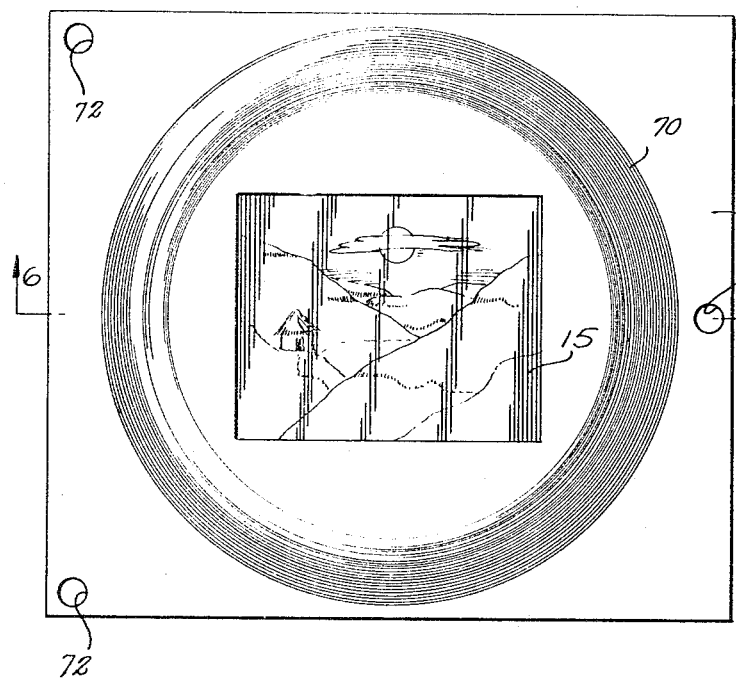
FIGURE 5 is a top view of a preferred form of the audio-visual tablet, having the spiral sound track surrounding the visual information, this audio-visual tablet being employed in the apparatus of FIGURE 1.
Figure 6:
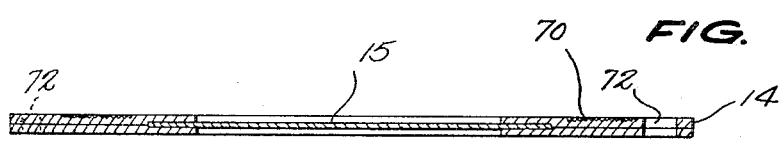
FIGURE 6 is a vertical cross sectional view taken on the line 6—6 of FIGURE 5.
Figure 7:
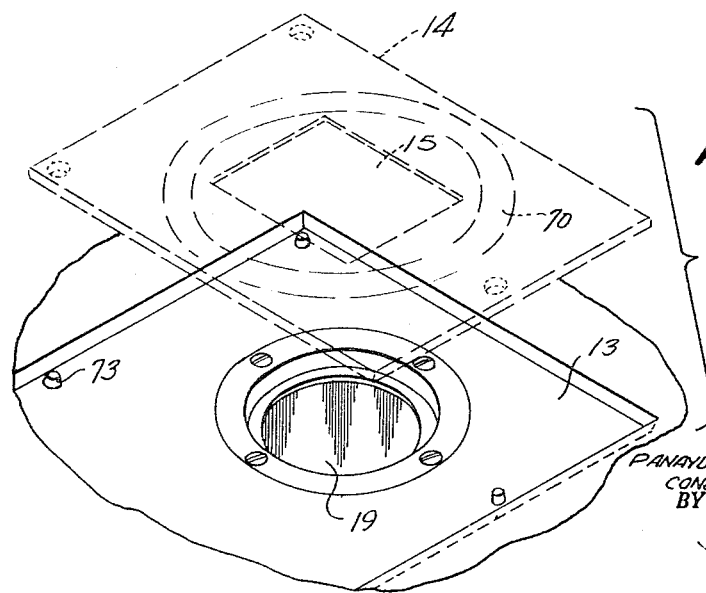
FIGURE 7 is a fragmentary perspective view showing the manner in which the tablet of FIGURES 5 and 6 is non-rotatably fitted into its seat in the main support of the apparatus of FIGURE 1.

Recent progress in the art of color photography has established colored slides as a popular and acceptable medium of photographic recording. While such a slide is quite small in actual size and can be made with relatively simple and inexpensive apparatus, it can be projected to almost any size with great definition and accurate colors. Thus, such slides have become an accepted source of entertainment and are employed widely in advertising, education, and similar activities. Such slides also have the advantage of being inexpensive to make, to store and to project.

Heretofore, the main disadvantage of projection slides of the type above described has been that they cannot be readily associated with synchronized sound, as in the case of sound motion pictures. Therefore, a prime purpose of the present invention is to overcome the handicap with regard to synchronization of a sound recording with a particular slide or other transparency to be projected.

Referring to the drawings, 11 generally designates an apparatus for simultaneously reproducing and projecting audio-visual information in accordance with the present invention. The apparatus 11 comprises a support 12 which is formed with a seat 13 adapted to receive an information-carrying tablet 14, presently to be described, said tablet including a slide or other transparency carrying visual information, shown at 15, and mounted in the central portion of the tablet 14.

The support 12 is provided at its central portion with a depending barrel member 16 which merges with a lamp housing 17 containing a suitable socket 18 in which is mounted a projection lamp 19, the lamp being arranged substantially on the axis of the barrel member 16 and being aligned with the transparency 15 of a tablet 14 disposed in the seat 13. Thus, the seat 13 is open at its central portion so as to be exposed to the subjacent barrel member 16 and therefore to allow light rays from the projection lamp 19 to reach the transparency 15.

A pair of conventional condenser lenses 18' and 19' are mounted in the barrel member 16 between the projection lamp 19 and the plane of the transparency 15, as is clearly shown in FIGURE 1, the condensing lenses 18', 19' being arranged to collimate the rays from the projection lamp 19 so that said rays are substantially parallel as they pass through the transparency 15.

As shown in FIGURE 1, the apparatus 11 includes a housing portion 20 in the lower portion of which the support member 12 and lamp housing 17 are mounted. One side wall of the upper portion of housing 20 is formed with a projection opening 21. Adjustably mounted in the upper portion of housing 20 is a reflecting mirror 22 which is employed to reflect the projected rays passing upwardly from the transparency 15 and to cause said rays to pass outwardly through the opening 21 towards a viewing screen, not shown. A focusing lens 23 is mounted on a stationary, horizontally extending supporting member 24 which is secured to the side wall 25 of housing 20 opposite the projection opening 21, as by angle bracket means 26. The projection lens 23 is thus disposed coaxially with the condensing lenses 18', 19', and is adapted to focus the rays from the projection lamp 19 onto the viewing screen after said rays have passed through the transparency 15, whereby the visual information on the transparency is transmitted to a suitable viewing screen in greatly magnified form.

A reflecting prism may be substituted for the mirror 22, a ground glass screen may be employed in the opening 21, and a suitable lens system may be provided to project the image from the transparency onto said ground glass screen.

As will be readily understood, the lens 23 in FIGURE 1 is located at its focal distance with respect to the illuminated visual information on the transparency 15, so that the rays leaving the lens will be properly transmitted so as to form a corresponding, greatly enlarged image on the viewing screen.

As shown in FIGURE 1, the rigid lens support 24 is integrally formed with a depending, annular skirt portion 27 which is coaxial with the optical axis defined by the lens 23, condensing lenses 19', 18' and projection lamp 19.

Designated at 28 is an annular carriage member which is rotatably supported within the depending skirt 27, as by the provision of a supporting ball bearing assembly 29 disposed between the depending skirt member 27 and the upper portion of the carriage member 28 and being constructed and arranged to rotatably support the carriage member for rotation around the optical axis defined by lens 23 and projection lamp 19, as above mentioned. The carriage member 28 is provided at its periphery with a horizontally extending annular flange 30 of suitable non-magnetic metal, such as aluminum, or the like, which extends between the poles of an actuating field structure 31 adapted to be energized from a suitable alternating current source, whereby to define an eddy current motor of the "repulsion" type frequently employed in driving phonograph turntables. Alternatively, the carriage member 28 is formed with a peripheral groove 33 to which may be coupled a suitable belt driven by a motor of any conventional type and adapted to drive the carriage member 28 at the correct speed corresponding to the play-back speed of the sound grooves on the tablet member 14, presently to be described.

Designated at 34 is a phonograph pick-up arm which is pivotally connected to the bottom surface of the annular carriage member 28 and which is arranged so that it may rotate around a vertical axis as well as around a horizontal axis. Designated at 42 is a flat contact ring which is secured on carriage member 28, being insulated therefrom by a suitable layer of insulation 43.

Arm 34 is provided at its outer end with a conventional phonograph pickup 44 having a depending stylus 45, the pickup 44 being of the conventional type having a crystal cartridge or any other conventional, well known cartridge. One terminal of the cartridge is grounded, and the ungrounded terminal thereof is connected by a suitable wire to the contact ring 42.

Designated at 48 is a contact arm which is pivoted at 49 to a bracket member 50 secured to and depending from the rigid support member 24, the arm 48 being provided at its end with a contact brush 51 or being formed with a cavity containing a drop of mercury depending therefrom and being held therein by surface tension, which conductively engages the contact ring 42, the arm 48 being biased in such a way as to urge the brush 51 against the ring by a biasing spring 53 engaged on the pivot element 49 and bearing between bracket member 50 and arm 48 to bias the arm 48 in a clockwise direction, as viewed in FIGURE 1.

Arm 48 may be of suitable insulating material, and the contact member 51 may be connected to a suitable lead wire 54 leading to an external sound channel comprising a conventional amplifier and loud speaker.

As a further alternative, separate concentric contact rings may be provided on the carriage member 28 and each terminal of the pickup 44 may be connected to a contact ring by a respective lead wire. An additional brush is then provided to engage the second contact ring, and the input of the external amplifier is connected between the two brushes.

As above mentioned, the stationary bottom support member 12 is provided with a seat 13 on which is received the audio-visual information-carrying tablet member 14. As shown in FIGURE 5, the tablet member 14 may be of any suitable shape, for example, may be rectangular in shape and may be provided at its central portion with the transparency 15 carrying the visual information to be projected. The tablet member 14 is provided with the spiral sound record grooves 70, carrying the audio information to be reproduced, said grooves surrounding the transparency 15 and being centered so that the axis of the grooves 70 substantially coincides with the optical axis defined by lens 23 and the projection lamp 19 when the tablet 14 is placed in the seat 13. To insure that the tablet will be accurately seated and will not rotate, the tablet is provided with a plurality of spaced apertures 72 or recesses which are located to receive upstanding stop pins 73 or spring-like projections provided on the seat 13 whereby the tablet 14 is positively located in the seat and is held against rotation.

In operation, the carriage member 28 is rotated by the energization of the electromagnetic driving element 31, the pickup stylus 45 being engaged in the record grooves 70 so that the audio information is transmitted to the external amplifier and is reproduced by the associated loud speaker. Simultaneously, the projection lamp 19 sends light rays through the condensing lenses 18', 19' and illuminates the transparency 15, the rays from the transparency being focussed by the lens 23 onto the external viewing screen. Therefore, the audio information is provided while the visual information carried by the transparency 15 may be viewed on the external viewing screen.

FIGURES 3 and 4 illustrate an alternative form of audio-visual record tablet 14' wherein the transparency 15 is located laterally adjacent rather than internally adjacent the record grooves 70. In this form of tablet, a pair of positioning apertures 72, or recesses, are provided at the corners of the tablet adjacent the transparency 15, and a third positioning aperture 72, or recess, is provided substantially centrally of the record grooves 70.

The support will be suitably modified so that the optical path is aligned with the transparency 15 of FIGURES 3 and 4, and will be laterally adjacent to the carriage member to conform with the spacing between the record grooves and the transparency.

For illustrative purposes, the support 12, the audio-visual tablet, and the annular carriage member 28 have been shown as substantially horizontal. However, it will be understood that the housing 20 may be arranged at any convenient angle, whereby the plane of carriage member 28 may be at a correspondingly tilted angle to the horizontal, and may, therefore, be at any angle, including the vertical, within the spirit of the present invention.

It will be noted that the audio information on the tablet may be repeated as many times as is desired without changing the tablet while the visual information is being projected. Thus, the associated sound becomes an integrated part of the information obtained from the tablet by the repetition of the audio information while the visual data on the tablet is being viewed. As is well understood, this is an important educational feature, since a student may repeat information on the sound track as many times as he requires to obtain a complete understanding of the associated visual information carried by the tablet, whereby the device of the present invention gives a distinct advantage over sound motion picture reproduction, when employed for education purposes.

While certain specific embodiments of an improved apparatus for simultaneously reproducing and projecting audio-visual information has been disclosed in the foregoing description, it will be understood that various modifications within the spirit of the invention may occur to those skilled in the art. Therefore, it is intended that no limitations be placed on the invention except as defined by the appended claims.

What is claimed is:

1. A unitary combined sound and picture-projection tablet comprising a relatively thin, flat support carrying on one face thereof a stationary open spiral sound track whose radial width is small compared with the outer radius of said track, and a photographic projection transparency secured fixedly on said support with its transparent area wholly within the inner diameter of said sound track; said support being light-transmitting at least in the area covered by said transparency.

2. A tablet according to claim 1, in which said sound track is substantially centered on said tablet.

3. A tablet according to claim 1, in which said sound track is integral with said support.

4. A tablet according to claim 1, in which said support is of laminar construction, with said transparency received between its layers.

References Cited by the Examiner

UNITED STATES PATENTS 2,360,099  10/1944  Biow _____ 88—26 X
2,478,538  9/1949  Leitner _____ 274—9
2,961,922  11/1960  Schwartz et al. _____ 88—28

FOREIGN PATENTS 1,045,122  11/1958  Germany.

JOHN M. HORAN, *Primary Examiner.*
NORTON ANSHER, *Examiner.*
VANCE A. SMITH, *Assistant Examiner.*